United States Patent Office 3,313,954
Patented Apr. 11, 1967

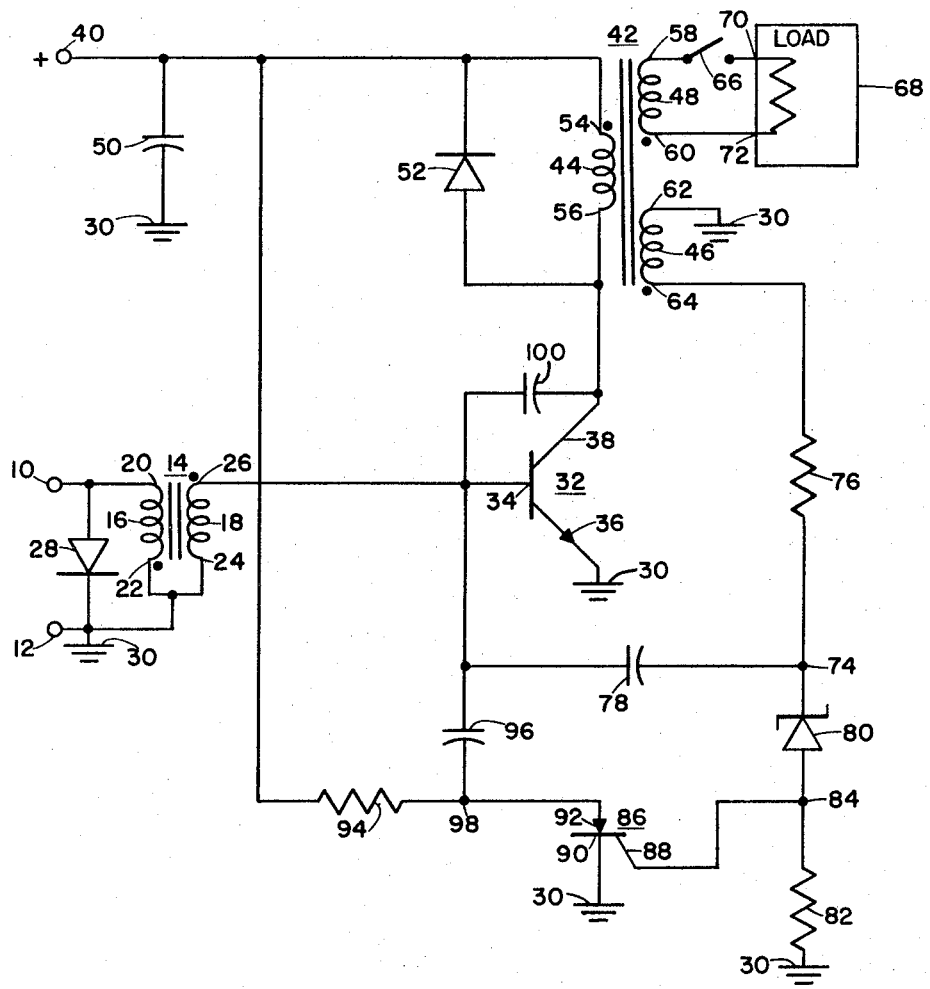

3,313,954
CONTROL APPARATUS
Arthur Hugh Walker, Clearwater, Fla., assignor to Honeywell Inc., Minneapolis, Minn., a corporation of Delaware
Filed Aug. 13, 1964, Ser. No. 389,244
6 Claims. (Cl. 307—88.5)

This invention relates to an improved electrical switching circuit. More particularly it provides for faster switching times in oscillators. In the specific embodiment shown hereinafter this invention is utilized in a blocking oscillator.

It is well known to those skilled in the art that fast rise and fall times are necessary in many applications. This invention uses a transistor operated in a switching mode to control the current flowing through a primary winding of a transformer. The transistor is switched to a current conducting condition by an input pulse. Positive feedback, obtained from a secondary winding of the transformer, is used to aid the input pulse in switching the transistor. The positive feedback is applied to the base of the transistor by capacitive coupling. As the capacitor charges the voltage across a zener diode increases until the zener diode breaks down. Current flowing through the zener diode raises the potential of the control terminal of a controlled rectifier and switches the controlled rectifier to a current conducting condition. The controlled rectifier is connected by means of a capacitor to the base of the transistor. When the controlled rectifier conducts current, the capacitor imparts a negative voltage spike to the base of the transistor thereby switching the transistor to a current blocking condition.

Therefore, it is an object of this invention to provide for fast switching times in electrical circuits.

It is another object of this invention to provide fast rise and fall times in the output wave form of a blocking oscillator.

These and other objects of this invention will be apparent to those skilled in the art upon consideration of the accompanying specification, along with the claims and the single figure which is a schematic drawing of one embodiment of a blocking oscillator utilizing this invention.

Referring to the drawing there is shown an input transformer 14 having a primary winding 16 and a secondary winding 18. An end terminal 20 of primary winding 16 is connected to an input terminal 10. An input terminal 12, the other end terminal 22 of primary winding 16, and an end terminal 24 of secondary winding 18 of transformer 14 are all connected to a common conductor, in this case ground or reference potential 30. A diode 28 is connected between input terminal 10 and ground 30 such that any positive voltage applied to terminal 10 will be shunted to ground. The other end terminal 26 of secondary winding 18 of transformer 14 is connected to a base 34 of a current control means, switching means, or NPN transistor 32. Transistor 32 further has a collector 38 and an emitter 36. The emitter 36 is directly connected to ground 30. Collector 38 is connected to an end terminal 56 of a primary winding 44 of a transformer 42. The other end terminal 54 of primary winding 44 is connected to a source of positive potential 40. Transformer 42 further has a secondary winding 46 with end terminals 62 and 64 and a secondary winding 48 with end terminals 58 and 60. End terminal 54 of primary winding 44, end terminal 64 of second winding 46, and end terminal 60 of secondary winding 48 are shown as dotted. According to the dot convention used, when the dotted terminal of one winding becomes positive with respect to the undotted terminal the dotted terminal of all other windings will also become positive with respect to the undotted terminals. The end terminal 62 of secondary winding 46 is connected to ground 30. The other end terminal 64 of secondary winding 46 is connected by means of a series connection of a resistor 76, a junction point 74, and a capacitor 78 to the base 34 of transistor 32. The base 34 of transistor 32 is further connected by means of a capacitor 100 to the collector 38. A diode 52 is connected between end terminals 54 and 56 of primary winding 44 of transformer 42 such the direction of easy current flow is from end terminal 56 to end terminal 54.

Junction point 74 is connected to ground 30 through a series path comprising a voltage control means, reference means, or zener diode means 80 and a resistor 82. A junction point 84, between the zener diode 80 and the resistor 82, is connected to a control terminal 88 of a switching means, voltage control means, or current control means 86. In the specific embodiment the current control means 86 is a silicon controlled rectifier (SCR). The SCR 86 further has an anode 92 and a cathode 90. The cathode 90 is connected to ground 30. The anode 92 is connected to a junction point 98 and from there through a resistor 94 to the source of energizing potential 40. Potential source 40 is further connected to ground 30 by means of a capacitor 50. A capacitor 96 is connected between junction point 98 and base 34 of transistor 32.

A load 68 has input terminals 70 and 72. Terminal 70 is connected to terminal 58 of secondary winding 48 of transformer 42 by means of a switch 66. Terminal 72 of load 68 is directly connected to terminal 60 of secondary winding 48. The load 68 is shown as a resistor for illustrative purposes only and can be any desired load.

In understanding the operation of this circuit it will be assumed that initially no input signal is applied to input terminals 10 and 12. The transistor 32 will be in an OFF or nonconducting condition, i.e., the transistor will present a high impedance between collector 28 and ground 30 such that only small leakage currents will flow through it and, hence, through primary winding 44 of transformer 42. The capacitors 50, 96 and 100 will charge to the potential of potential source 40. Capacitor 96 will charge through the resistor 94 and capacitor 100 will charge through the winding 44 with the return path in both cases being winding 18 of transformer 14 to ground 30. With only small leakage and charging currents flowing through the primary winding 44 of transformer 42 there will be essentially no voltage developed across secondard windings 46 and 48. Thus, the load 68 will not be activated.

It will now be assumed that a pulse is applied at input terminals 10 and 12 such that terminal 10 becomes negative with respect to terminal 12 and hence ground 30. Current will flow from ground 30 through primary winding 16 of transformer 14 to terminal 10. The directions of the windings 16 and 18 of transformer 14 are such that terminal 26 of secondary winding 18 will become positive with respect to terminal 24 and hence positive with respect to ground. This potential difference across secondary winding 18 will be applied to transistor 32 causing the base 34 to become positive with respect to the emitter 36, thereby turning transistor 32 to an ON or conducting condition.

Current will now flow from potential source 40, through primary winding 44 of transformer 42, through collector 38 and emitter 36 of transistor 32, to ground 30. The current flowing through primary winding 44 causes terminal 54 to become positive with respect to terminal 56. Terminal 64 of secondary winding 46 will, therefore, become positive with respect to terminal 62 and ground 30. This positive potential of terminal 64 will be coupled to the junction point 74 by means of the resistor 76. As the capacitor 78 was initially uncharged, it will tend to raise the potential of the base 34 of transistor 32 as the potential of the junction point 74 rises. This action will turn transistor 32 more fully ON causing more current to flow through primary winding 44 and causing the potential of the base 34 to rise still more. The capacitor 78 will begin to charge through resistor 76 because the potential of the base 34 cannot become more than a fraction of a volt above ground potential. When the capacitor 78 has charged sufficiently to allow the potential of the junction point 74 to reach the breakdown voltage of the zener diode 80, current will flow through the zener diode 80 and the resistor 82 thereby raising the potential of the junction point 84. Current will also flow from junction point 84, through the control terminal 88 and cathode 90 of SCR 86, to ground 30, thus, turning the SCR to an ON or current conducting condition as opposed to the previous OFF or current blocking condition.

When the SCR 86 is ON it has a very low impedance, Therefore, the potential of junction point 98 which was previously the potential of potential source 40, will be suddenly lowered. The capcitor 96, which was charged to the potential of source 40, will sharply lower the potential of the base 34 of transistor 32. This negative potential of base 34 with respect to emitter 36 will switch the transistor 32 to a nonconducting or OFF condition. When the potential of base 34 is lowered, capacitor 100 will lower the potential of collector 38 also. Potential source 40 will begin to recharge capacitor 100 and the same current will aid in discharging capacitor 96, thus, preventing capacitor 96 from drawing excessive reverse currents through transistor 32. When transistor 32 is switched to a nonconducting condition the potential across primary winding 44 of transformer 42 will charge abruptly, thus creating voltage and current transients. Diode 52, which is across the primary winding 44 of transformer 32, will clip these transients thereby minimizing their effect.

When the transistor 32 is OFF the potential differences across primary winding 44 and secondary winding 46 will disappear. Thus, the potential of junction point 74 will lower and current will cease to flow through the zener diode 80. The control terminal 88 of SCR 86 will then be lowered to ground potential. When capacitor 96 has discharged sufficiently there will not be enough current flowing through resistor 94 and the SCR 86 to sustain the SCR 86 in an ON condition. Thus, the SCR 86 will switch to an OFF or current blocking condition and capacitor 96 will recharge through resistor 94. Capacitor 78 will discharge through resistor 76 and the circuit will be ready for another input pulse.

The output waveform across secondard winding 48 of transformer 42 will be substantially a square wave. When the transistor 32 is ON and current is flowing through the primary winding 44, terminal 60 of secondary winding 48 will be positive with respect to terminal 58. When the transistor 32 is turned OFF and current ceases to flow through the primary winding 44, the potential difference across the secondary winding 48 will disappear. If switch 66 is closed this square wave voltage will activate the load 68.

The length of the output pulses can be predetermined or controlled by the RC time constant of resistor 76 and capacitor 78 and by the breakdown voltage of the zener diode 80.

While I have shown only one specific embodiment of this invention, and used specific terminology in describing the invention for purposes of clarity, it is to be understood that I wish to be limited only by the scope and language of the appended claims.

I claim as my invention:
1. A blocking oscillator comprising, in combination:
a transistor having a base, a collector, and an emitter means;
reference potential means;
means connecting said emitter to said reference potential means;
a source of input signals connected to said base for switching said transistor to a current conducting condition;
transformer means having first, second, and third windings with said second winding connected to said collector;
a source of energizing potential connected to said second winding to form a current path including said transistor, said second winding, and said source of energizing potential;
controlled rectifier means having an anode, a cathode, and a control electrode;
a circuit including said controlled rectifier means, first impedance means, and said source of energizing potential;
means connecting said anode to said base;
feedback means, including said second winding, second impedance means, and a zener diode, connected to said base such that feedback voltage developed in said second winding aids in switching said transistor to said current conducting condition, said feedback voltage operating said zener diode to provide a control current to said control electrode for switching said controlled rectifier to a current conducting condition, and the conduction of said controlled rectifier causing a signal to be applied to said base thereby switching said transistor to a current blocking condition; and
load means connected to said third winding,
2. A blocking oscillator comprising, in combination:
first and second control means each having an energized terminal, a common terminal, and a control terminal and each further having a current conducting condition and a current blocking condition;
a source of energizing potential;
transformer means having first, second, and third windings;
means connecting said source of energizing potential, said first control means, and said first winding in a circuit such that said first control means controls the current flowing through said first winding;
a source of input signals connected to said control terminal of said first control means for applying a first control signal to said control terminal to switch said first control means to said current conducting condition;
feedback means including capacitive means connected to said control terminal of said first control means, for applying a feedback signal developed in said second winding to said control terminal of said first control means for aiding said first control signal in switching said first control means;
voltage reference means connected to said capacitive means and operating in response to said feedback signal to apply a second control signal to said control terminal of said second control means at a predetermined time after said input signal, said second control signal causing said second control means to switch from said current blocking condition to said current conducting condition, and the conduction of said second control means causing a third control signal to be applied to said control terminal of said first control means to switch said first control means to said current blocking condition; and
output means connected to said third winding.
3. A blocking oscillator comprising, in combination:
current control means to be switched between a conducting state and a nonconducting state;
activation means in circuit with said current control means to switch said current control means to said conducting state;
a source of energizing potential;
transformer means having first and second windings;
means connecting said current control means, said first winding and said source of energizing potential in a circuit;
feedback means, including a series connection of said second winding, resistance means, and capacitive means connected to said current control means, for applying a feedback signal developed in said second winding to said current control means to aid in switching said current control means to said conducting state;

switching means connected to said current control means and having a current conducting state and a current blocking state; and voltage control means connected to a junction between said resistive and capacitive means and to a control means of said switching means and operating in response to said feedback signal to switch said switching means to said current conducting state, the conduction of said switching means operating to switch said current control means to said nonconducting state.

4. Apparatus of the class described comprising, in combination:

switching means to be switched between a conducting state and a nonconducting state;

transformer means;

a source of energizing potential in circuit with a primary winding of said transformer means and with said switching means;

activation means connected to said switching means for switching said switching means to said conducting state;

feedback means including a secondary winding of said transformer means and first capacitive means connected to said switching means to aid in switching said switching means to said conductive state;

voltage reference means for connecting said feedback means to a current control means, said voltage reference means providing an output signal therefrom when the voltage across said capacitive means reaches a predetermined value; and second capacitive means connecting said current control means to said switching means, said current control means operating in response to said output signal from said voltage reference means to impart a signal through said second capacitive means to switch said switching means from said conducting state to said nonconducting state.

5. A blocking oscillator comprising, in combination:

first and second switching means each having a current conducting state and a current blocking state;

a source of activation signals connected to said first switching means for switching said first switching means to said current conducting state;

transformer means having first, second, and third windings;

means connecting a source of energizing potential through said first winding to said first switching means;

zener diode reference means connected to said second switching means;

feedback means including connections to said second winding and said reference means, said reference means operating in response to a feedback signal developed in said second winding to switch said second switching means from said current blocking state to said current conducting state when the feedback signal exceeds a predetermined signal level;

capacitive means connecting said first and second switching means so that the conduction of said second switching means causes said capacitive means to provide a signal to switch said first switching means to said current blocking state; and output means connnected to said third winding.

6. Apparatus of the class described comprising, in combination:

switching means having a conducting condition and a nonconducting condition;

control means;

transformer means having first and second windings;

means connecting said switching means, said first winding, and a source of energizing potential in a common circuit path;

feedback means including resistive means, capacitive means connected to provide feedback to said switching means, voltage control means connected to said capacitive means, and said second winding;

a source of activation signals in circuit with said switching means for switching said switching means to said conducting condition;

means connecting said voltage control means to said control means so that said voltage control means, operating in response to a feedback signal developed in said second winding and to the voltage across said capacitive means, switches said control means to a conducting condition; and capacitive means connecting said control means to said switching means so that said conduction of the control means causes said switching means to switch to said nonconducting condition.

References Cited by the Examiner

UNITED STATES PATENTS

| 2,886,706 | 5/1959 | Rogers | 331—148 |
| 3,124,706 | 3/1964 | Alexander | 307—88.5 |
| 3,158,751 | 11/1964 | Nelson | 331—112 |

OTHER REFERENCES

Solid State Products, Inc., Application on Circuit Design Note, Bulletin D420-02, December 1959, page 15.

ARTHUR GAUSS, *Primary Examiner.*

B. P. DAVIS, *Examiner.*